(12) United States Patent
Griffin

(10) Patent No.: US 12,504,116 B2
(45) Date of Patent: Dec. 23, 2025

(54) ACCESSORY SUPPORT FOR HUNTING SADDLE

(71) Applicant: Jacob Joseph Griffin, Ponchatoula, LA (US)

(72) Inventor: Jacob Joseph Griffin, Ponchatoula, LA (US)

( * ) Notice: Subject to any disclaimer, the term of this patent is extended or adjusted under 35 U.S.C. 154(b) by 0 days.

(21) Appl. No.: 18/379,660

(22) Filed: Oct. 13, 2023

(65) Prior Publication Data

US 2024/0159352 A1 May 16, 2024

Related U.S. Application Data

(60) Provisional application No. 63/415,967, filed on Oct. 13, 2022.

(51) Int. Cl.
*F16M 13/02* (2006.01)
(52) U.S. Cl.
CPC .................. *F16M 13/02* (2013.01)
(58) Field of Classification Search
CPC .......... F16G 11/14; F16G 11/02; F16M 13/02

USPC ....................................................... 248/205.1
See application file for complete search history.

(56) References Cited

U.S. PATENT DOCUMENTS

| | | | | |
|---|---|---|---|---|
| 6,966,520 B2 * | 11/2005 | Sherman | ................. | F16G 11/14 242/388.4 |
| 7,434,662 B2 * | 10/2008 | McFall | ................. | A01M 31/02 182/187 |
| 8,870,475 B1 * | 10/2014 | Bennett | ................. | H04N 23/54 396/419 |
| 9,377,672 B1 * | 6/2016 | Clearman | ................. | A45F 5/02 |
| 2016/0192637 A1 * | 7/2016 | Wydner | ................. | A47F 5/08 211/85.7 |
| 2021/0116002 A1 * | 4/2021 | Coulter | ................. | F16G 11/14 |
| 2024/0167537 A1 * | 5/2024 | How | ................. | E04B 9/20 |

* cited by examiner

*Primary Examiner* — Todd M Epps
(74) *Attorney, Agent, or Firm* — HSML P.C.

(57) ABSTRACT

An apparatus includes three connectors to connect an accessory to a hunting saddle assembly, thereby providing a stable and secure platform in an environment in which materials are primarily flexible and bendable.

10 Claims, 4 Drawing Sheets

ACCESSORY SUPPORT FOR HUNTING SADDLE

CROSS-REFERENCE TO RELATED APPLICATIONS

This application claims the benefit of U.S. Provisional Patent Application No. 63/415,967, filed Oct. 13, 2022, and which is hereby incorporated by reference in its entirety.

TECHNICAL FIELD

This disclosure relates to accessories for hunting saddles.

BACKGROUND OF THE INVENTION

Hunters often hunt from an elevated position above the ground, which reduces the likelihood that they will be detected by game animals while also providing the hunter with an enhanced field of view for spotting and shooting game animals. Some hunters may use a wooden or steel structure to support a platform above the ground, thereby providing an elevated surface for the hunter. However, the support structure is problematic because it is expensive and heavy, and it must be transported to the hunting location (which may be remote). The size and complexity of the support structure makes it difficult to move, thereby reducing a hunter's options. Other hunters may employ stands mounted to a tree with a seat.

In lieu of a heavy tree stand, "saddle hunting" involves the use of a harness worn by a hunter to suspend the hunter above the ground via a flexible tether mounted to a tree. Saddle hunting eliminates the need for heavy, bulky equipment. Furthermore, saddle hunting provides significantly greater movement compared to a traditional tree stand because the hunter is free to move in almost every direction, whereas a stationary seat limits a hunter's movements.

SUMMARY

An apparatus is provided herein that enables a hunter to securely and stably mount a camera, phone, or other accessory to a saddle hunting assembly. The apparatus includes structure with three connectors (such as clips and/or hooks) for attaching the structure to a saddle hunting assembly. The three points of connection to the saddle hunting assembly makes the structure a stable and secure base for holding or supporting objects such as cameras, cell phones, etc. on the saddle hunting assembly, which is comprised almost entirely of flexible materials. Although hunting saddles have significant advantages over traditional, rigid hunting stands, they previously lacked any way to support any accessory that a hunter may desire due to their construction primarily of flexible fabrics, ropes, etc. Thus, the apparatus provided herein improves upon the prior art by overcoming a significant limitation of hunting saddles.

A corresponding method of use is also provided.

The above features and advantages and other features and advantages of the present disclosure are readily apparent from the following detailed description of the best modes for carrying out the disclosure when taken in connection with the accompanying drawings.

DETAILED DESCRIPTION

Figure 1:
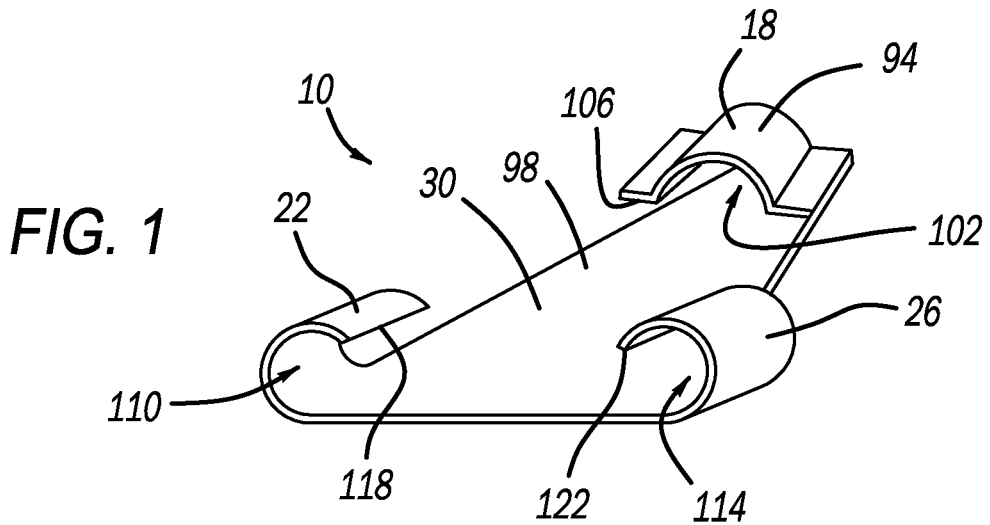
FIG. 1 is a schematic, perspective view of an apparatus for attaching an accessory to a saddle hunting assembly.
Figure 2:
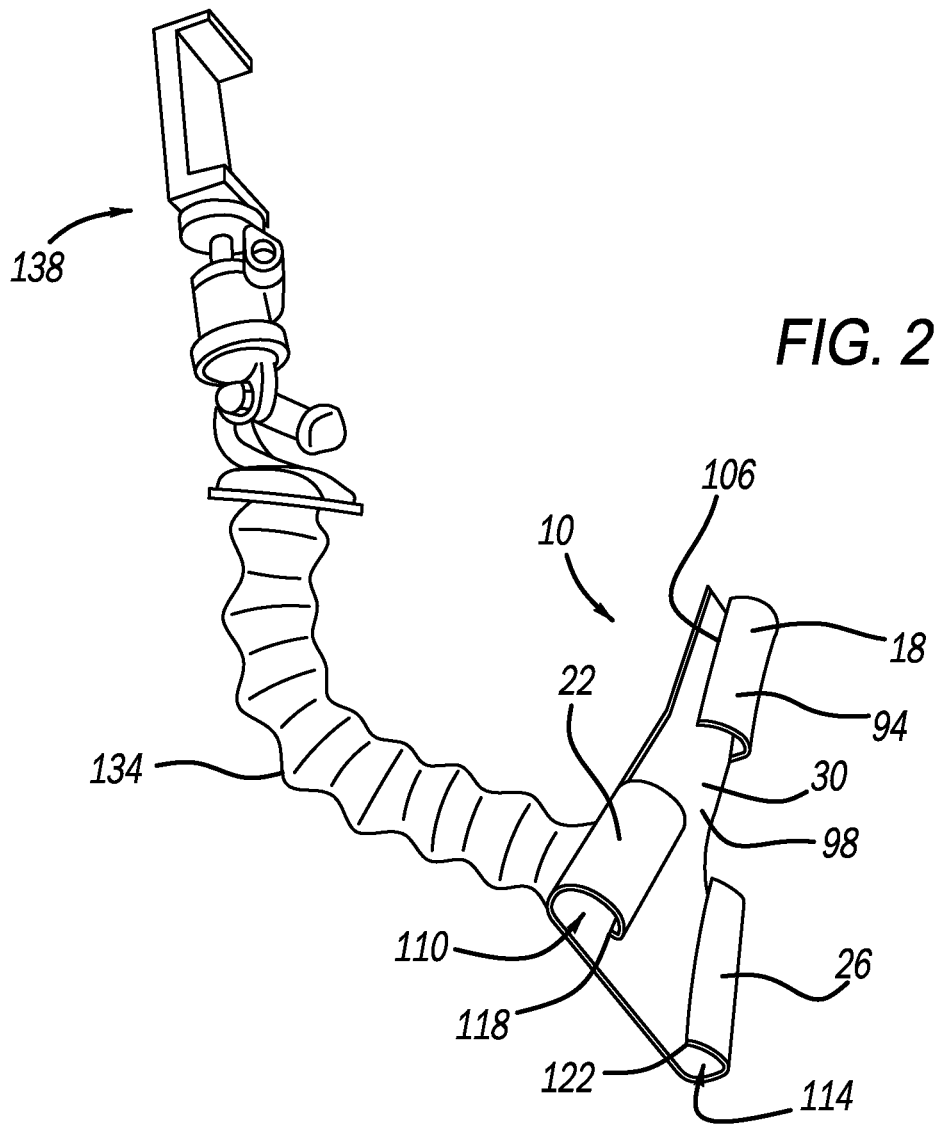
FIG. 2 is a schematic, perspective view of the apparatus of FIG. 1 with a gooseneck support and holder connected thereto.

Referring to the Figures, wherein like reference numbers refer to like components throughout, an apparatus 10 for use with a saddle hunting assembly 14 is schematically depicted. Referring specifically to FIGS. 1 and 2, the apparatus 10 includes a clip 18, a first hook 22, a second hook 26, and structure 30. The structure 30 interconnects the clip 18, the first hook 22, and the second hook 26. In the embodiment depicted, the structure 30 is substantially triangular in shape, with the clip 18 at one vertex of the triangle, the first hook 22 at another vertex of the triangle, and the second hook 26 at yet another vertex of the triangle.

In the embodiment depicted, the clip 18 and the hooks 22, 26 are integrally formed with the structure 30, i.e., the clip 18, hooks 22, 26 and structure 30 are formed from a single piece of material. However, it should be noted that, alternatively and within the scope of the claimed invention, the clip 18 and hooks 22, 26 may be separately-formed pieces mounted to the structure 30.

The saddle hunting assembly 14 includes a harness 34 having two ends 38, 42, a carabiner 46 having a metal loop 50 and a gate 54, and a bridge 58 interconnecting the two ends 38, 42 of the harness 34. The harness 34, which may sometimes be referred to as a "saddle" by those skilled in the art, is typically one or more flexible panels of a flexible material, such as fabric, mesh, etc. The harness 34 is configured to support a hunter's thighs, buttocks, and/or lower back. The harness 34 in the embodiment depicted also includes a first loop 62 at end 38 and a second loop 66 at end 42.

The bridge 58 is a rope that is tied to, or otherwise attached to, the first loop 62 and the second loop 66, and thus the bridge 58 interconnects and supports both ends 38, 42 of the harness. The bridge 58 passes through the metal loop 50 of the carabiner 46, such that one part 70 of the bridge 58 is on one side of the carabiner 46 and another part 74 of the bridge 58 is on another side of the carabiner 46. The metal loop 50 of the carabiner 46 is D-shaped in the embodiment depicted, and thus includes a substantially linear segment 78. The linear segment 78 has a circular cross-sectional shape.

Figure 3:
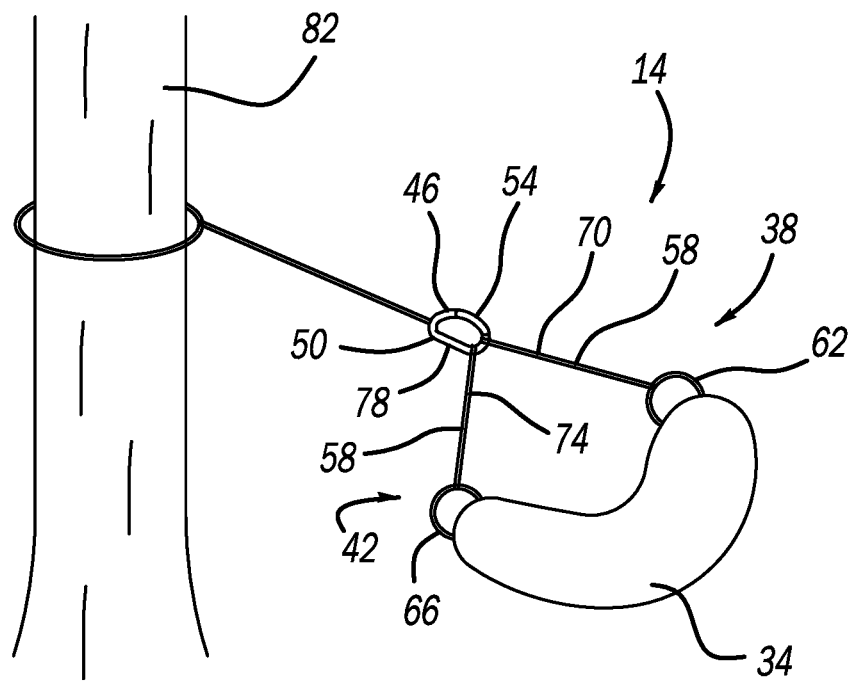
FIG. 3 is a schematic, perspective view of a saddle hunting assembly connected to a tree.
Figure 4:
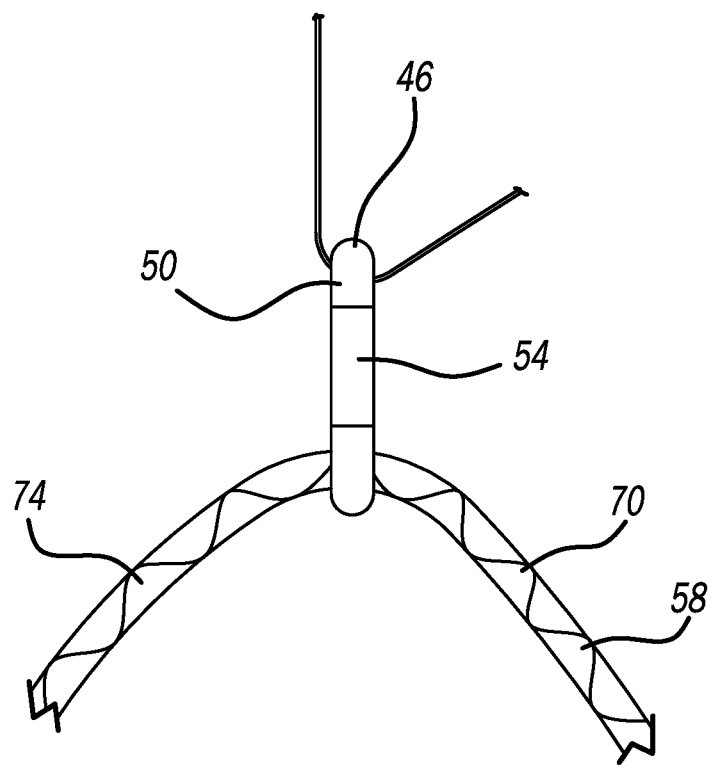
FIG. 4 is a schematic, top view of a portion of the saddle hunting assembly.
Figure 5:
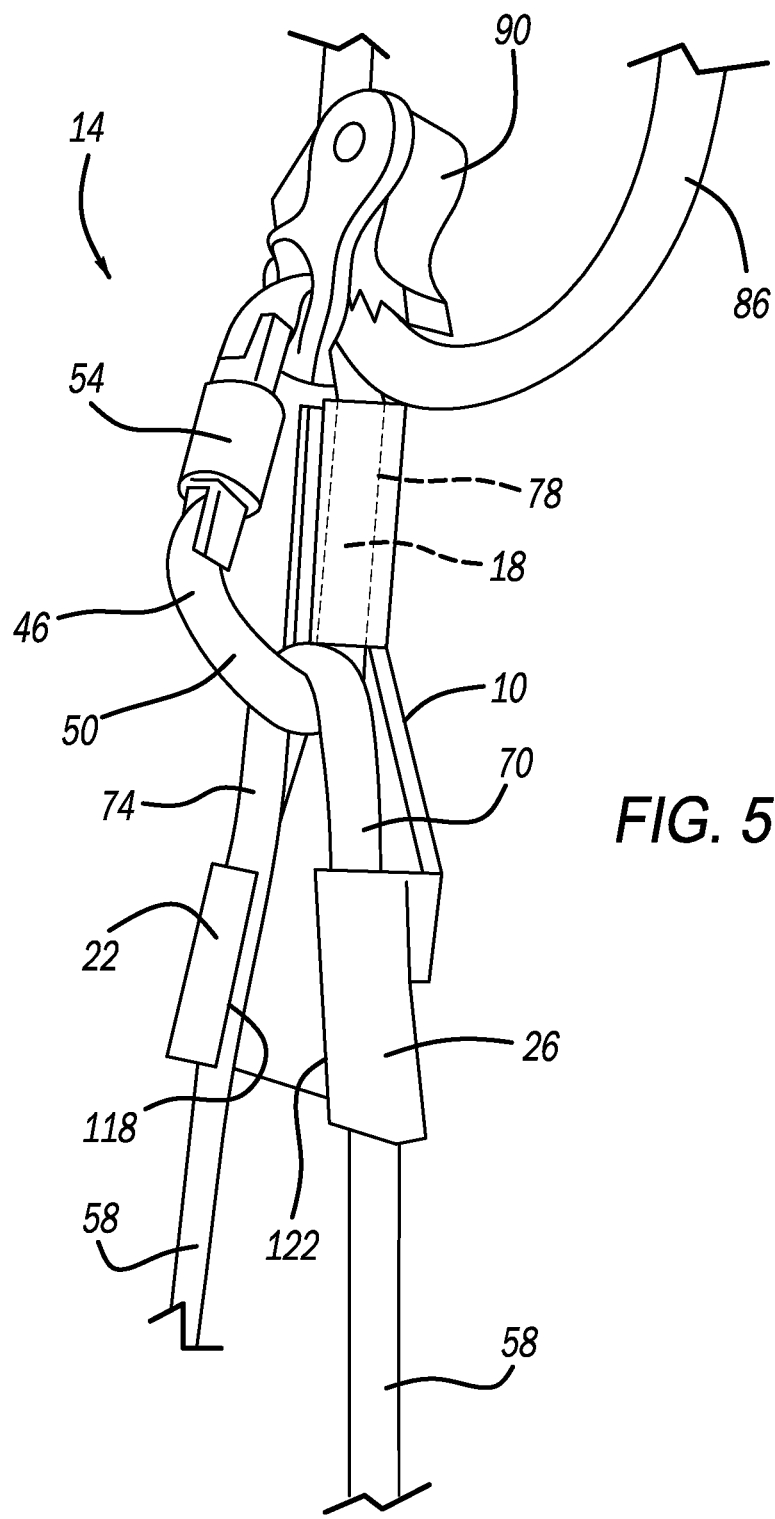
FIG. 5 is a schematic, perspective view of the apparatus of FIG. 1 attached to the saddle hunting assembly.
Figure 6:
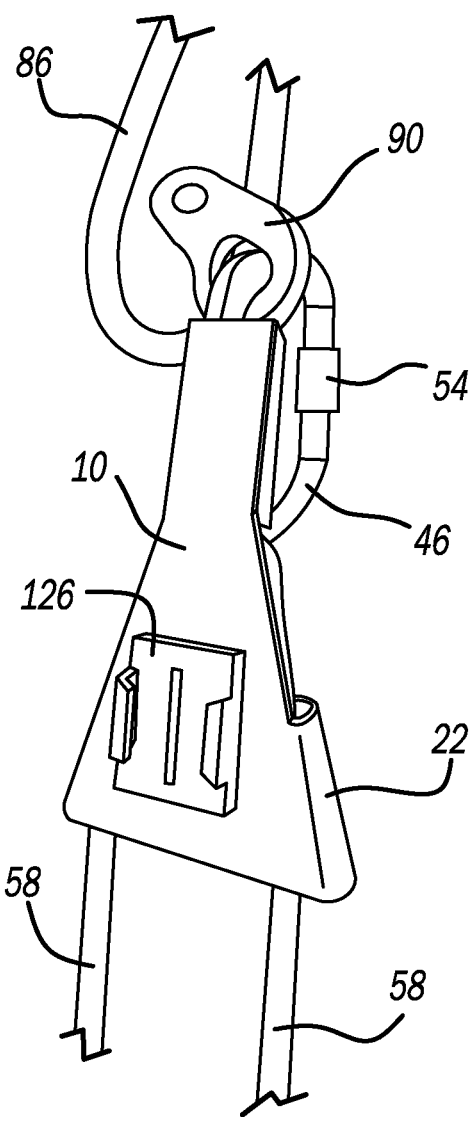
FIG. 6 is another schematic, perspective view of the apparatus attached to the saddle hunting assembly.

In use, the saddle hunting assembly 14 is connected to a tree 82 via a flexible tether 86, which is typically a rope. As shown in FIG. 3, one end of the tether 86 is secured to the tree, such as by tying the tether around the circumference of the tree, and the other end of the tether 86 is secured to the carabiner 46. The tether 86 may be tied to the metal loop 50, or connected to the metal loop 50 via a belay device 90 as shown in FIGS. 5 and 6.

The apparatus 10 is configured to connect to the saddle hunting assembly 14. More specifically, the clip 18 is configured to engage with and retain the carabiner 46, and first hook 22 is configured to engage with and retain one part 74 of the bridge 58, and the second hook 26 is configured to engage with and retain the other part 70 of the bridge 58.

Although various clip and hook configurations may be employed within the scope of the claimed invention, the clip 18 in the embodiment depicted includes an arm 94 that protrudes from the structure 30. The structure 30 defines a substantially flat surface 98, and the arm 94 cooperates with the surface 98 to define a first passageway 102 therebetween. The arm 94 also cooperates with the surface 98 to define a lateral opening 106 to the passageway 102 that extends the length of the passageway 102. When the arm 94 is in an unstressed state, the width of the opening 106 is substantially less than the width of the passageway 102, and the width of the opening 106 is substantially less than the diameter of the linear portion 78 of the carabiner 46.

Accordingly, the linear portion 78 of the carabiner may be inserted into the passageway 102 through the lateral opening 106 by elastically deforming the arm 94 as the linear portion 78 passes through the opening 106. Once the linear portion 78 is within the passageway 102, the arm 94 will elastically return to its unstressed state and the linear portion 78 will be captured between the surface 98 and the arm 94, as shown in FIGS. 5 and 6.

Similarly, hooks 22, 26 are arms projecting from the structure 30 that cooperate with surface 98 to define respective passageways 110, 114 and respective lateral openings 118, 122. When the hooks 22, 26 are unstressed, the width of the openings 118, 122 is less than the diameter of the bridge 58, and the width of passageways 110, 114 is greater than the diameter of the bridge 58. Accordingly, the part 74 of the bridge 58 may be inserted into the passageway 110 of hook 22 through the lateral opening 118 by elastically deforming the hook 22 as the part 74 of the bridge 58 passes through the opening 118. Once the part 74 is within the passageway 110, the hook 22 will elastically return to its unstressed state and the part 74 will be captured between the surface 98 and the hook 22, as shown in FIGS. 5 and 6.

Similarly, the part 70 of the bridge 58 may be inserted into the passageway 114 of hook 26 through the lateral opening 122 by elastically deforming the hook 26 as the part 70 of the bridge 58 passes through the opening 122. Once the part 70 is within the passageway 114, the hook 26 will elastically return to its unstressed state and the part 74 will be captured between the surface 98 and the hook 26, as shown in FIGS. 5 and 6. The width of the passageways 110, 114 is preferably wide enough to enable the bridge 58 to slide relative to the hooks 22, 26 while still being retained therein.

Figure 7:
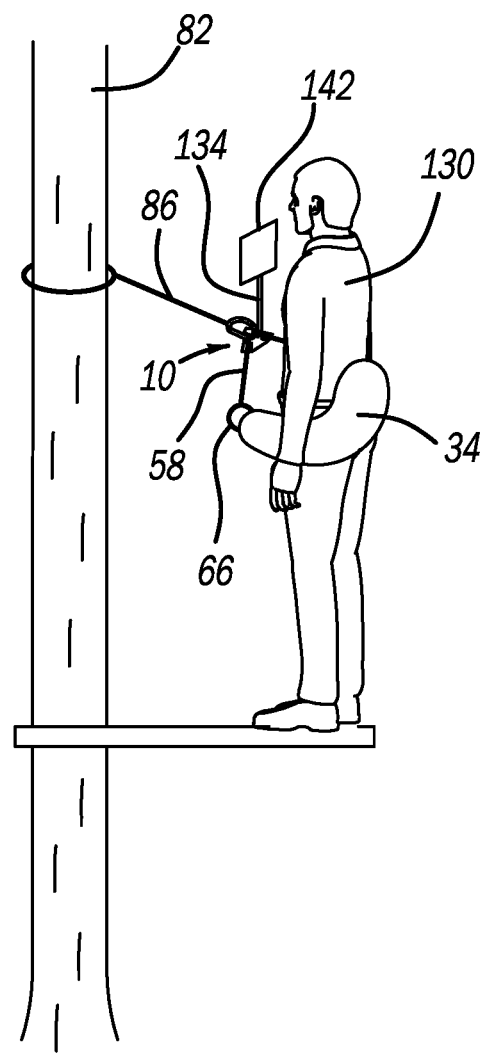
FIG. 7 is a schematic, perspective view of a hunter employing the apparatus to support a camera.

Thus, the apparatus 10 provides three points of connection to the saddle hunting assembly 10, which provides a stable mounting surface for various accessories that may be desired by a hunter during hunting. In the embodiment depicted, the apparatus 10 includes a connector 126 mounted to the structure 30 on the side opposite surface 98. The connector 126 is releasably engageable with other connectors to attach various accessories, including cameras, cell phones, etc. to the apparatus 10 where it will be accessible to a hunter 130 within the harness 34, as shown in FIG. 7.

For example, as shown in FIG. 2, a gooseneck support 134 may be attached to the connector 126; the gooseneck support 134 may have a camera holder 138 mounted at one end to secure a camera (as shown at 142 in FIG. 7) to the apparatus 10. An example of a connector is shown and described in U.S. Pat. No. 9,377,672, issued Jun. 28, 2016, and which is hereby incorporated by reference in its entirety.

Those skilled in the art will recognize a variety of materials that may form the apparatus 10, including but not limited to metals such as aluminum and polymers such as thermoplastic acrylic-polyvinyl chloride materials. In the embodiment depicted, the apparatus is formed with ⅛ inch thick Kydex®.

While the best modes for carrying out the disclosure have been described in detail, those familiar with the art to which this disclosure relates will recognize various alternative designs and embodiments for practicing the disclosure within the scope of the appended claims.

The invention claimed is:

1. An apparatus for use with a hunting saddle assembly including a harness having two ends, a carabiner having a metal loop and a gate, and a bridge interconnecting the two ends of the harness and passing through the metal loop, the apparatus comprising:
   a clip;
   a first hook;
   a second hook;
   a structure interconnecting the clip, the first hook, and the second hook; and
   a connector mounted to the structure at which accessories are connectable to the structure,
   wherein the clip is configured to attach the carabiner to the structure;
   wherein the first hook is configured to connect the bridge to the structure; and
   wherein the second hook is configured to connect the bridge to the structure.

2. The apparatus of claim 1, further comprising a camera operatively connected to the structure via the connector, the camera being one of the accessories connectable to the structure.

3. The apparatus of claim 1, wherein the structure defines a surface;
   wherein the clip includes an arm that cooperates with the surface to define a first passageway;
   wherein the first hook cooperates with the surface to define a second passageway; and
   wherein the second hook cooperates with the surface to define a third passageway.

4. The apparatus of claim 3, wherein the arm cooperates with the surface to define a first lateral opening to the first passageway;
   wherein the first hook cooperates with the surface to define a second lateral opening to the second passageway; and
   wherein the second hook cooperates with the surface to define a third lateral opening to the third passageway.

5. The apparatus of claim 1, wherein the accessories are individually connectable to the structure at the connector.

6. A method of using an apparatus with a hunter saddle assembly, comprising:
   possessing the hunting saddle including a harness having two ends, a carabiner having a metal loop and a gate, and a bridge interconnecting the two ends of the harness and passing through the metal loop;
   possessing the apparatus having a clip, a first hook, a second hook, and structure interconnecting the clip, the first hook, and the second hook;
   engaging a portion of the metal loop with the clip such that the clip retains the carabiner;
   engaging a portion of the bridge on one side of the carabiner with the first hook; and
   engaging another portion of the bridge on the other side of the carabiner with the second hook.

7. The method of claim 6, further comprising attaching an accessory to the structure.

8. The method of claim 7, wherein the accessory is a camera.

9. The method of claim 6, further comprising attaching the carabiner to a tree with a tether.

10. An apparatus for use with a hunting saddle assembly including a harness having two ends, a carabiner having a metal loop and a gate, and a bridge interconnecting the two ends of the harness and passing through the metal loop, the apparatus comprising:
- a clip;
- a first hook;
- a second hook; and
- a structure interconnecting the clip, the first hook, and the second hook;
- wherein the clip is configured to attach the carabiner to the structure;
- wherein the first hook is configured to connect the bridge to the structure;
- wherein the second hook is configured to connect the bridge to the structure;
- wherein the structure defines a surface;
- wherein the clip includes an arm that cooperates with the surface to define a first passageway;
- wherein the first hook cooperates with the surface to define a second passageway; and
- wherein the second hook cooperates with the surface to define a third passageway.

* * * * *